United States Patent
Stammen et al.

(10) Patent No.: US 11,433,451 B2
(45) Date of Patent: Sep. 6, 2022

(54) CONVERSION PRESS AND TAB STOCK FEEDER ASSEMBLY THEREFOR

(71) Applicant: Stolle Machinery Company, LLC, Centennial, CO (US)

(72) Inventors: Dennis Cornelius Stammen, Brookville, OH (US); Andrew Thomas Hogenkamp, Dayton, OH (US); Mark R. Mitchell, Sidney, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 405 days.

(21) Appl. No.: 16/711,585

(22) Filed: Dec. 12, 2019

(65) Prior Publication Data
US 2021/0178450 A1    Jun. 17, 2021

(51) Int. Cl.
| | | |
|---|---|---|
| *B21D 51/38* | (2006.01) | |
| *B30B 1/26* | (2006.01) | |
| *B65H 20/04* | (2006.01) | |
| *B21D 43/09* | (2006.01) | |
| *B65G 47/82* | (2006.01) | |
| *B23Q 7/00* | (2006.01) | |
| *B21D 51/44* | (2006.01) | |

(52) U.S. Cl.
CPC .......... *B21D 51/383* (2013.01); *B21D 43/09* (2013.01); *B21D 51/446* (2013.01); *B23Q 7/00* (2013.01); *B30B 1/261* (2013.01); *B65G 47/82* (2013.01); *B65H 20/04* (2013.01)

(58) Field of Classification Search
CPC .... B21D 51/383; B21D 43/09; B21D 51/446; B23Q 7/00; B30B 1/261; B65G 47/82; B65H 20/04
See application file for complete search history.

(56) References Cited

U.S. PATENT DOCUMENTS

| | | | |
|---|---|---|---|
| 2,668,023 A | * | 2/1954 | Whitson ............ B65H 19/2215 242/532.3 |
| 4,568,230 A | | 2/1986 | Brown |
| 6,808,351 B1 | | 10/2004 | Brown et al. |
| 6,926,487 B1 | | 8/2005 | Jendrick |

(Continued)

FOREIGN PATENT DOCUMENTS

CN    108136476    *    6/2018    ............. B21D 51/38

OTHER PUBLICATIONS

U.S. Patent and Trademark Office, PCT/US20/62641 International Search Report and Written Opinion, dated Feb. 23, 2021, 13 pages.

*Primary Examiner* — James R Bidwell
(74) *Attorney, Agent, or Firm* — Eckert Seamans Cherin & Mellott LLC

(57) ABSTRACT

A tab stock feeder assembly for a press includes a plurality of support elements, a plurality of rotating elements, and a number of operative elements. Each rotating element is rotatably coupled to an associated support element. Each operative element coupled to at least one of the support element or one of the rotating element and wherein each the operative element is structured to be engaged by a rotating element. The tab stock feeder assembly further includes a wear reduction assembly including a plurality of wear reducing elements. A plurality of support elements have at least one wear reduction assembly wear reducing element disposed between a rotating element and the associated support element.

16 Claims, 7 Drawing Sheets

(56) References Cited

U.S. PATENT DOCUMENTS

| | | | |
|---|---|---|---|
| 9,321,097 B2 | 4/2016 | Butcher et al. | |
| 9,598,254 B2 * | 3/2017 | Gentile | B65H 20/04 |
| 9,932,185 B2 * | 4/2018 | Suzuki | B21D 43/09 |
| 10,073,443 B2 | 9/2018 | Gorsuch et al. | |
| 11,173,537 B2 * | 11/2021 | Suzuki | H02K 15/02 |
| 2008/0267736 A1 * | 10/2008 | Artrip | B21D 51/383 |
| | | | 413/66 |
| 2014/0271044 A1 * | 9/2014 | Butcher | B21D 51/44 |
| | | | 413/66 |

* cited by examiner

CONVERSION PRESS AND TAB STOCK FEEDER ASSEMBLY THEREFOR

BACKGROUND

Field

The disclosed concept relates to a tab stock feeder assembly for a press, such as a conversion press, and, more specifically, to a tab stock feeder assembly including a wear reduction assembly.

Background Information

As is known, metal containers such as, but not limited to, beverage and beer cans include a can end having a tear panel and a tab (i.e., a pull tab). That is, the tab is pivotally coupled to the can end adjacent the tear panel. To open the container, a user lifts one end of the tab causing the opposite end to engage the tear panel. The bias of the tab causes the tear panel to partially separate from the other portions of the can end thereby creating an opening in the can end.

The tabs are formed in a tab press or, more typically, in a conversion press. A conversion press is a press structured to form both the can end and the tabs. Regardless of the type of press used, the tab is formed from a metal sheet, or coil, of metal such as, but not limited to, aluminum. The material in the metal sheet or coil is, as used herein, the "tab stock." That is, the tab stock is moved via a tab stock feeder into the forming elements of the press wherein the metal is formed into the tab, cut from the sheet/coil, and coupled to the can end (which is also being formed from a different metal sheet/coil, or from preformed shells, at the same time). As is known, the formation/cutting/coupling is accomplished by a press having upper (or first) tooling and lower (or second) tooling. Each of the toolings have various forming constructs coupled thereto which are structured to form the metal. Each opposing pair of forming constructs are, typically, identified as a "station." Each forming station is structured to partially form the tab and/or can end. That is, the material advances through the toolings and at each station, a portion of the tab/can end is formed. Typically, the tab is only separated from the tab stock when the tab is coupled to the can end. When the can end is separated from the sheet/coil from which it has been formed, a conveyor such as, but not limited to, a conveyor belt moves the can end. When the can end with the tab coupled thereto reaches the end of the toolings, the can end is substantially completed. The following will further detail the formation of the tabs without reference to the can ends.

That is, a tab is formed when the upper tooling reciprocates between a first position, wherein the upper tooling is spaced from the lower tooling, and, a forming, second position, wherein the upper tooling is adjacent the lower tooling. It is understood that when the upper tooling is in the second position the forming constructs engage and form the tab stock. Further, as is known, when the upper tooling is in the first position, the tab stock advances so that the tab is progressively formed by the stations.

The tab stock feeder is the construct that advances the tab stock. It is understood that the tab stock feeder is structured to move the tab stock when the upper tooling is not in the second position. That is, the tab stock cannot advance when the upper tooling is in the second position because the forming constructs are engaging the tab stock. Accordingly, the tab stock feeder is structured to advance the tab stock when the upper tooling is not in the second position and to disengage from the tab stock when the upper tooling is in the second position.

In a common embodiment, the tab stock feeder includes a drive wheel, a base, a lifted member and a biasing roller. A motor, or similar construct, is operatively coupled to the drive wheel and causes the drive wheel to rotate. The lifted member is pivotally coupled to the base and is structured to move in a reciprocating, pivoting motion between a first position, wherein the lifted member is substantially adjacent the base, and, a second position, wherein the lifted member is substantially spaced from said base. In an exemplary embodiment, a rotating cam member coupled to the base moves the lifted member between the first and second positions. The biasing roller is coupled to the lifted member and moves therewith. The biasing roller is positioned generally above the drive wheel. The tab stock is disposed between the drive wheel and the biasing roller.

In this configuration, the biasing roller moves between a first position, wherein the biasing roller engages the tab stock and biases the tab stock against the drive wheel, and, a second position, wherein the biasing roller is spaced from the tab stock. It is understood that when the tab stock is biased against the drive wheel, the drive wheel causes the tab stock to advance. Conversely, when the biasing roller is in the second position, the tab stock is not operatively engaged by the drive wheel and does not advance. It is further understood that the lifted member/biasing roller is in first position when the upper tooling is also in (or moving toward/away from) its first position, and, the lifted member/biasing roller is in second position when the upper tooling is in its second position. Thus, as noted above, the tab stock is stationary when the upper tooling is in its second position and the material is being formed. When the upper tooling separates from the lower tooling, i.e., when the upper tooling is in (or moving toward/away from) its first position, the tab stock is in motion.

The tab stock feeder, however, has several problems generally related to wear and tear. That is, while the moving elements are separated by bearings and similar constructs, the reciprocal motion causes wear in a specific location on certain elements of the tab stock feeder. For example, the lifted member is, typically, coupled to the base by a hinge assembly including integral hinge sleeves and a hinge pin. Stated alternately, the lifted member is pivotally coupled to the base by a hinge pin. When the lifted member reciprocates between the first and second positions, the hinge sleeves and hinge pin are each exposed to wear in a specific location. That is, in a typical configuration, the hinge sleeves are disposed at each end of the hinge pin. Thus, the hinge sleeves only engage the hinge pin at the ends of the hinge pin. Further, because the integral hinge sleeves and the hinge pin are not perfect cylinders, engagement between each hinge sleeve and the hinge pin occurs in a specific location. As the lifted member pivots the hinge sleeves and the hinge pin wear at these specific locations. Thus, while the bulk of the hinge sleeves/pin remains substantially free of wear, there is extensive wear at these specific locations. This is a problem.

Further, the biasing roller is structured to assist with advancing the tab stock in a forward direction. The biasing roller is mounted on a toroidal bearing assembly, i.e., an assembly with an inner circular race, an outer circular race and bearings (e.g., ball bearings; roller bearings) therebetween, that is disposed in, or parallel with, the plane of rotation of the biasing roller. The toroidal bearing assembly is structured to, and does, ameliorate forces in the plane of rotation of the toroidal bearing assembly. For example, a force applied to the outer race in the plane of rotation of the toroidal bearing assembly (and other than a force applied exactly in a radial direction) causes the outer race to rotate relative to the inner race; thus, the force applied to the toroidal bearing assembly, and therefore the biasing roller, is ameliorated.

The biasing roller and the toroidal bearing assembly are further exposed to forces applied in directions other than in the plane of rotation of the toroidal bearing assembly. Such forces are not ameliorated by the roller bearing and the biasing roller, and elements that support the biasing roller, are exposed to wear. That is, using a Cartesian coordinate system and as used herein, the biasing roller is structured to rotate about an "X-axis." That is, the "X-axis" is an axis that extends along the axis of rotation of the biasing roller. Motion about this axis is, as used herein, a "roll." As used herein, the "Y-axis" extends along the direction the tab stock moves. Motion about the "Y-axis" is, as used herein, "pitch," and, motion about the "Z-axis" is, as used herein, "yaw." While the biasing roller (and the toroidal bearing assembly) is structured to "roll," i.e., rotate about the X-axis, the biasing roller is further exposed to forces that would cause the biasing roller to pitch or yaw. Because the toroidal bearing assembly is not structured to accommodate forces in these directions, the forces cause "wear generated by forces applied to a rotating element in a plane other than the plane of rotation of that element," as that term is defined below. This is a problem. Further, it is desirable for the biasing roller to rotate at least slightly about the Y-axis so as to allow the biasing roller to engage the stock evenly. A toroidal bearing assembly does not allow for rotation about the Y-axis and is, therefore, a problem.

There is, therefore, a need for a tab stock feeder assembly for a press including a wear reduction assembly structured to reduce the wear on the rotating elements and/or the elements that support the rotating elements. There is a further need for a tab stock feeder assembly for a press wherein a wear reducing element is disposed between a rotating element and the associated support element.

SUMMARY

These needs, and others, are met by at least one embodiment of the disclosed concept which provides a tab stock feeder assembly for a press including a plurality of support elements, a plurality of rotating elements, and a number of operative elements. Each rotating element is rotatably coupled to an associated support element. Each operative element is coupled to at least one of the support element or one of the rotating element and each operative element is structured to be engaged by a rotating element. The tab stock feeder assembly further includes a wear reduction assembly including a plurality of wear reducing elements. A plurality of support elements have at least one wear reduction assembly wear reducing element disposed between a rotating element and the associated support element.

A press, such as a conversion press, employing the aforementioned tab stock feeder assembly is also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
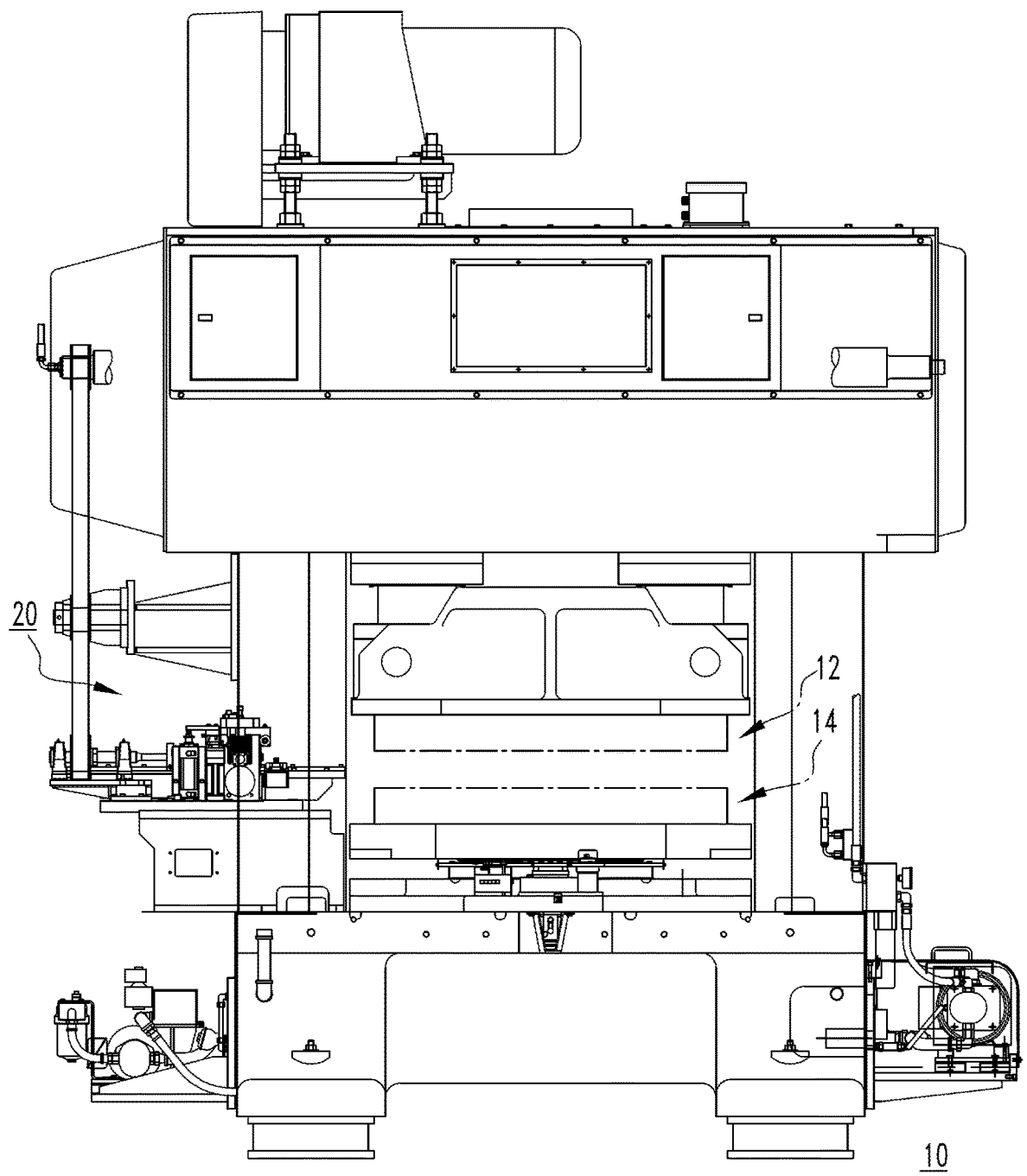
FIG. 1 is a side elevation view of a conversion press employing a tab stock feeder assembly in accordance with an embodiment of the disclosed concept.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, in a term such as, but not limited to, "[X] structured to [verb] [Y]," the "[Y]" is not a recited element. Rather, "[Y]" further defines the structure of "[X]." That is, assume in the following two examples "[X]" is "a mounting" and the [verb] is "support." In a first example, the full term is "a mounting structured to support a flying bird." That is, in this example, "[Y]" is "a flying bird." It is known that flying birds, as opposed to swimming/walking birds, typically grasp a branch for support. Thus, for a mounting, i.e., "[X]," to be "structured" to support a flying bird, the mounting is shaped and sized to be something a flying bird is able to grasp similar to a branch. This does not mean, however, that the flying bird is being recited. In a second example, "[Y]" is a house; that is, the second exemplary term is "a mounting structured to support a house." In this example, the mounting is structured as a foundation as it is well known that houses are supported by foundations. As before, a house is not being recited, but rather defines the shape, size, and configuration of the mounting, i.e., the shape, size, and configuration of "[X]" in the term "[X] structured to [verb] [Y]."

As used herein, "associated" means that the elements are part of the same assembly and/or operate together, or, act upon/with each other in some manner. For example, an automobile has four tires and four hubcaps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component includes a nut (as well as an opening through which the bolt extends) or threaded bore.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true. With regard to electronic devices, a first electronic device is "operatively coupled" to a second electronic device when the first electronic device is structured to, and does, send a signal or current to the second electronic device causing the second electronic device to actuate or otherwise become powered or active.

As used herein, "temporarily disposed" means that a first element(s) or assembly (ies) is resting on a second element(s) or assembly (ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening is made from a deformable or compressible material, the opening may even be slightly smaller than the component being inserted into the opening. With regard to surfaces, shapes, and lines, two, or more, "corresponding" surfaces, shapes, or lines have generally the same size, shape, and contours. With regard to elements/assemblies that are movable or configurable, "corresponding" means that when elements/assemblies are related and that as one element/assembly is moved/reconfigured, then the other element/assembly is also moved/reconfigured in a predetermined manner. For example, a lever including a central fulcrum and elongated board, i.e., a "see-saw" or "teeter-totter," the board has a first end and a second end. When the board first end is in a raised position, the board second end is in a lowered position. When the board first end is moved to a lowered position, the board second end moves to a "corresponding" raised position. Alternately, a cam shaft in an engine has a first lobe operatively coupled to a first piston. When the first lobe moves to its upward position, the first piston moves to a "corresponding" upper position, and, when the first lobe moves to a lower position, the first piston, moves to a "corresponding" lower position.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

As used herein, a "planar body" or "planar member" is a generally thin element including opposed, wide, generally parallel surfaces, i.e., the planar surfaces of the planar member, as well as a thinner edge surface extending between the wide parallel surfaces. That is, as used herein, it is inherent that a "planar" element has two opposed planar surfaces with an edge surface extending therebetween. The perimeter, and therefore the edge surface, may include generally straight portions, e.g., as on a rectangular planar member such as on a credit card, or be curved, as on a disk such as on a coin, or have any other shape.

As used herein, the word "unitary" means a component that is created as a single piece or unit. That is, a component that includes pieces that are created separately and then coupled together as a unit is not a "unitary" component or body.

As used herein, "unified" means that all the elements of an assembly are disposed in a single location and/or within a single housing, frame or similar construct.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can. Further, as used herein, "radially extending" means extending in a radial direction or along a radial line. That is, for example, a "radially extending" line extends from the center of the circle or cylinder toward the radial side/surface. Further, as used herein, "axially extending" means extending in the axial direction or along an axial line. That is, for example, an "axially extending" line extends from the bottom of a cylinder toward the top of the cylinder and substantially parallel to, or along, a central longitudinal axis of the cylinder.

As used herein, a "tension member" is a construct that has a maximum length when exposed to tension, but is otherwise substantially flexible, such as, but not limited to, a chain or a cable.

As used herein, "generally curvilinear" includes elements having multiple curved portions, combinations of curved portions and planar portions, and a plurality of linear/planar portions or segments disposed at angles relative to each other thereby forming a curve.

As used herein, an "elongated" element inherently includes a longitudinal axis and/or longitudinal line extending in the direction of the elongation.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, "generally" means "in a general manner" relevant to the term being modified as would be understood by one of ordinary skill in the art.

As used herein, "substantially" means "by a large amount or degree" relevant to the term being modified as would be understood by one of ordinary skill in the art.

As used herein, "at" means on and/or near relevant to the term being modified as would be understood by one of ordinary skill in the art.

As used herein, a "wear reduction assembly" means an assembly including a plurality of "wear reducing elements." Further, to be a "wear reduction assembly," the "wear reducing elements" must all be associated with a mechanical device/assembly, or a number of related devices/assemblies, that has/have an identifiable mechanical purpose. That is, for example, in an automobile, the elements of the drivetrain, e.g., engine, transmission, axles, have the identifiable mechanical purpose of imparting motion to the vehicle. Thus, collectively, the "wear reducing elements" associated with an automobile drivetrain could be a "wear reduction assembly." Conversely, a "wear reducing element" that is part of an automobile drivetrain and a "wear reducing element" that is part of the automobile air conditioner cannot form a "wear reduction assembly" because the automobile drivetrain and the automobile air conditioner do not have the same "identifiable mechanical purpose." That is, as used herein, an "identifiable mechanical purpose" means a purpose related to the operation of the mechanical device/assembly. Thus, in the example above, the automobile drivetrain has the purpose of providing motion to the vehicle whereas the automobile air conditioner has the purpose of providing comfort to the passengers. Further, a purpose such as, but not limited to, "providing comfortable travel to the passengers" is not an "identifiable mechanical purpose" because the mechanical elements cannot be "comfortable."

Further, as used herein, to be a "wear reduction assembly" the assembly must include different types of "wear reducing elements." That is, an assembly that only includes bearings, including an assembly with different types of bearings, cannot be a "wear reduction assembly" because all the "wear reducing elements" are of the same type.

As used herein, a "wear reducing element" means an element/assembly that is structured to substantially reduce wear on another element in a specific location and/or reduce wear generated by forces in a non-primary direction associated with a motion in a primary direction.

As used herein, "in a specific location" means a localized area. For example, an elongated, generally circular rod when viewed in cross-section appears as a circle. If another element rubbed, i.e., caused wear, on the rod at the "one o'clock" position and only at one end of the rod, then the wear is "in a specific location." If the other element engaged the rod over 360° at one end, then the wear is not "in a specific location." Similarly, if the other element engaged the rod over its longitudinal length at the "one o'clock" position, then the wear is not "in a specific location." Thus, "in a specific location" means in a small, discrete area relative to the total surface area of the element being engaged, as would be understood by one of skill in the art.

Further, as used herein, "wear generated by forces applied to a rotating element in a plane other than the plane of rotation of that element" means wear on a rotating element (or an element supporting the rotating element) caused by forces that are not applied substantially in the plane of rotation of that element or in a plane substantially parallel to the plane of rotation of that element. As used herein, the "plane of rotation" of a rotating element is the plane substantially perpendicular to the axis of rotation of the rotating element. Further, as used herein, a toroidal bearing assembly does not "wear generated by forces applied to a rotating element in a plane other than the plane of rotation of that element" and, as such, a toroidal bearing assembly cannot be a "wear reducing element" as defined above. Conversely, and as use herein, a spherical bearing disposed about such a cylindrical member ameliorates forces applied in any direction. Thus, a spherical bearing is structured to, and does, "wear generated by forces applied to a rotating element in a plane other than the plane of rotation of that element." As such, a spherical bearing is, as used herein, a "wear reducing element."

A press, such as for example and without limitations, conversion press 10 is shown in FIG. 1. As is known, the conversion press 10 is structured to form can ends (not shown). That is, conversion press 10 includes upper tooling 12 (shown in simplified form in phantom line drawing) and lower tooling 14 (shown in simplified form in phantom line drawing), each of which supports a number of forming constructs (none numbered). The upper tooling 12 reciprocates between a first position, wherein the upper tooling 12 is spaced from the lower tooling 14, and, a forming, second position, wherein the upper tooling 12 is adjacent the lower tooling 14. That is, the conversion press 10 is structured to form metal when in the second position. Stock material, i.e., metal from a sheet or coil (see, e.g., tab stock 200 partially shown in simplified form in FIG. 2), is passed through the conversion press 10 and is formed into the can ends. That is, can end stock material (or in some embodiments shells) are formed into the disk-like body of the can end. Tab stock material 200 is formed into the tab (see, e.g., tabs 202 shown partially formed on tab stock material 200 in simplified form in FIG. 2) for the can end. In an exemplary embodiment, the can end stock material and the tab stock material 200 move generally perpendicularly to each other. The tabs 202 are coupled to the can end disk-like body near the end of the forming process.

The tab stock material 200, hereinafter "tab stock," is moved by a tab stock feeder assembly 20. That is, the tab stock feeder assembly 20 is structured to move the tab stock 200 through the conversion press 10. As discussed above, the tab stock 200 does not move when the upper tooling 12 is in the second position, i.e., when the tab stock 200 (FIG. 2) is being formed. Thus, the tab stock feeder assembly 20 is structured to index, i.e., move intermittently, the tab stock 200 through the conversion press 10.

The tab stock feeder assembly 20 is shown in greater detail in FIGS. 2-7. In an exemplary embodiment, the tab stock feeder assembly 20 includes a plurality of support elements 22, a plurality of rotating elements 24 and a number of operative elements 26. As used herein, a "support element" is an element that supports a "rotating element" element. As used herein, a "rotating element" is an element that rotates or pivots, including a reciprocating pivotal motion, and which. A "rotating element" is able to support another element and, as such, a single element can be both a "support element" and a "rotating element." As used herein, an "operative element" is an element that operatively engages, or which is operatively engaged by, another element. Each rotating element 24 is rotatably coupled to an associated support element 22. That is, as used herein, the support element 22 to which a rotating element 24 is most closely coupled, i.e., with the fewest intermediate elements, is the "associated support element" 22. Each operative element 26 is coupled to at least one support element 22 or one rotating element 24 and is structured to be engaged by a rotating element 24. The tab stock feeder assembly 20 also includes a wear reduction assembly 30 including a plurality of wear reducing elements 32. A plurality of support elements 22 have at least one wear reduction assembly wear reducing element 32 disposed between a rotating element 24 and the associated support element 22.

In an exemplary non-limiting embodiment, the tab stock feeder assembly 20 and/or the plurality of support elements 22 includes a base 40 and a lifted member assembly 42. The base 40 may itself move (e.g., pivot) and/or may contain or comprise one or more moving elements (e.g., without limitation, drive wheel 28; rotating shaft 74). The tab stock feeder assembly 20 and/or the plurality of rotating elements 24 includes the lifted member assembly 42 and a cam member 44 (best shown in FIG. 3). The number of operative elements 26 includes a cam follower 46. The base 40 includes a generally planar upper surface 50 and the lifted member assembly 42 includes an opposing generally planar lower surface 60. As shown in the section view of FIG. 6, the base 40 defines a plurality of hinge sleeves 52. The lifted member assembly 42 defines a plurality of hinge sleeves 62. The lifted member assembly 42 further includes a generally cylindrical hinge pin 64. The lifted member assembly hinge pin 64 is, in another exemplary non-limiting embodiment, identified as part of the base 40. The lifted member assembly 42 is rotatably, i.e., pivotally, coupled to the base 40 by the lifted member assembly hinge pin 64. That is, the lifted member assembly hinge pin 64 is disposed in both the base plurality of hinge sleeves 52 and the lifted member assembly plurality of hinge sleeves 62.

Figure 3:
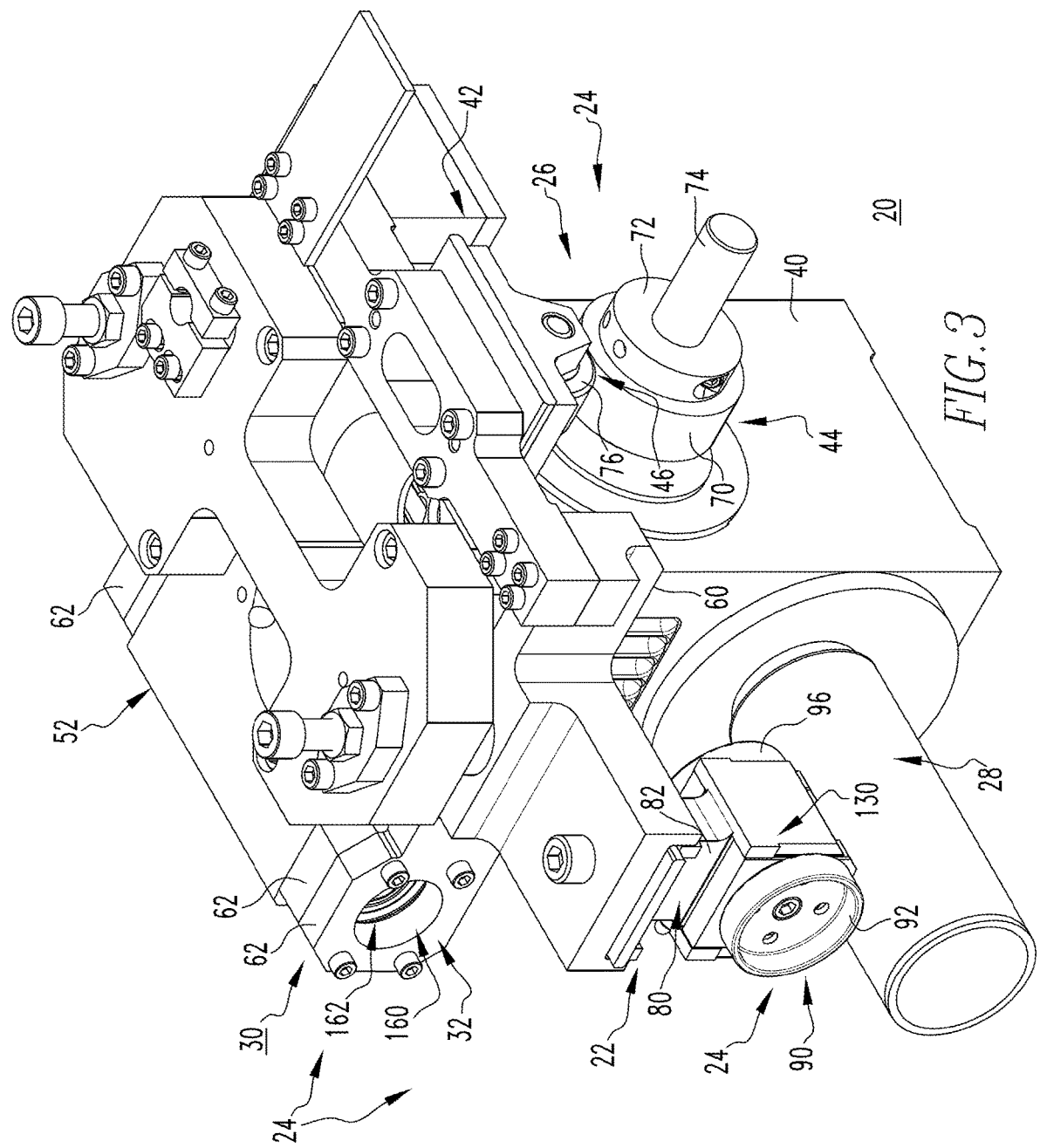
FIG. 3 is an isometric view of a portion of a the tab stock feeder assembly of FIG. 2.
Figure 4:
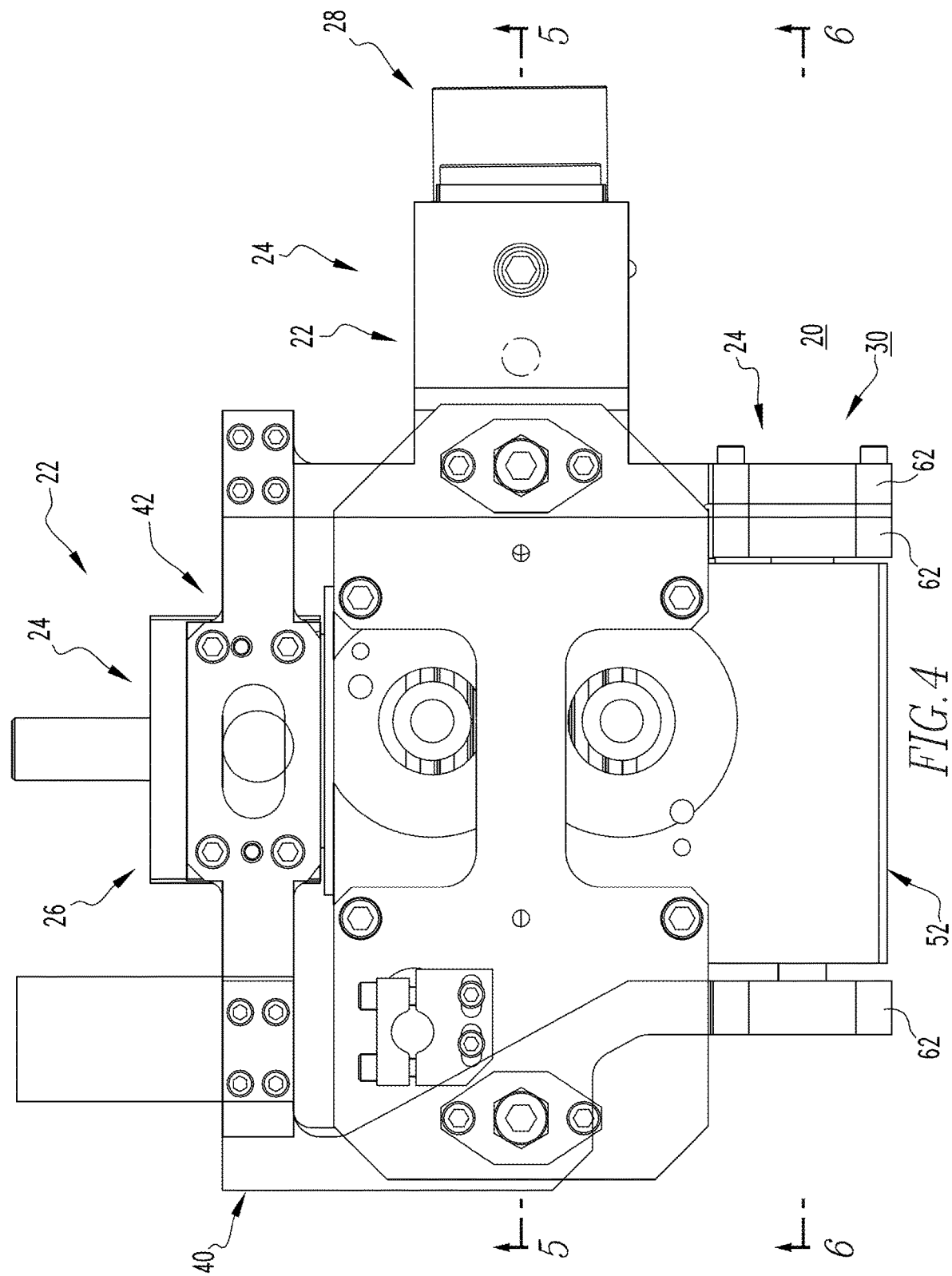
FIG. 4 is a top plan view of the portion of the tab stock feeder assembly of FIG. 3.
Figure 5:
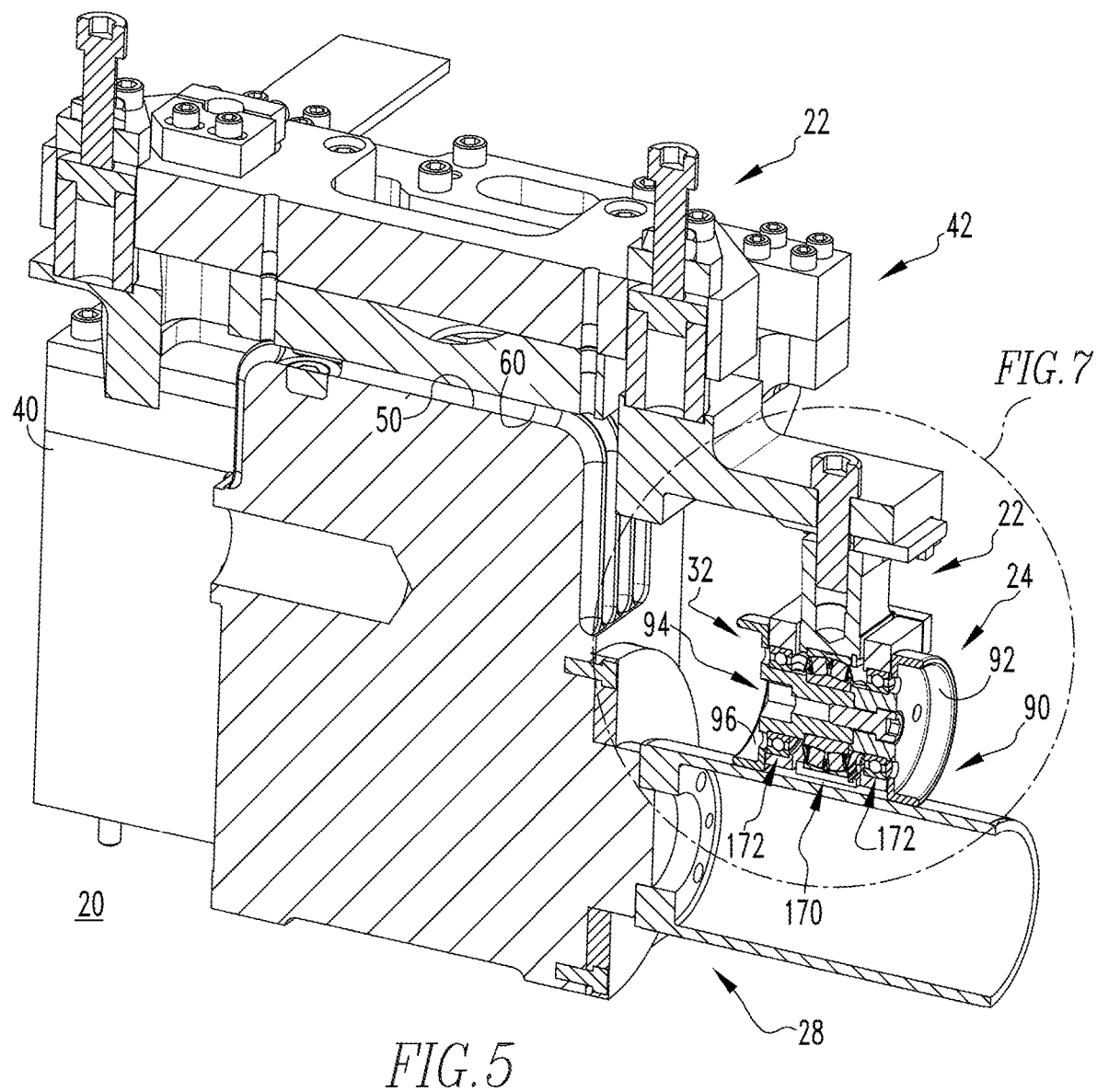
FIG. 5 is an isometric section view taken along line 5-5 of FIG. 4.

Referring to FIG. 3, the cam member 44, in an exemplary non-limiting embodiment, is an eccentric cam, i.e., a generally circular body 70 with a coupling 72, i.e., a passage, that is offset from the center of the circular body 70. The cam member 44 is coupled, directly coupled, or fixed to a rotating shaft 74. The rotating shaft 74 extends through, or is otherwise disposed adjacent to, the base 40 opposite the base plurality of hinge sleeves 52. A conversion press drive assembly (not shown) operatively engages the rotating shaft 74 and causes the rotating shaft 74 to rotate. The cam follower 46, which is shown as wheel 76, is coupled, or rotatably coupled, to the lifted member assembly 42 opposite the cam member 44, i.e., in a position wherein the cam follower 46 is structured to be, and is, operatively engaged by the cam member 44.

In this configuration, the lifted member assembly 42 is structured to, and does, pivotally reciprocate between a first position, wherein the lifted member assembly 42 is generally adjacent the base 40, and, a second position, wherein the lifted member assembly 42 is generally spaced from base 40. That is, in the first position, the lifted member assembly lower surface 60 is generally parallel to, and immediately adjacent, the base upper surface 50. In the second position, the lifted member assembly lower surface 60 is generally angled relative to the base upper surface 50; thus, there is space between the lifted member assembly lower surface 60 and the base upper surface 50. It is understood that, as the cam member 44 rotates and engages the cam follower 46, the lifted member assembly 42 pivotally reciprocates between the first position and the second position. In an exemplary non-limiting embodiment, the lifted member assembly 42 preferably pivots over an arc of between 0-10 degrees, and, more preferably, pivots less than 1 degree. It will be appreciated that reducing the amount of relative movement in the foregoing manner has the advantages of reducing the amount of lift thus reducing the amount of associated force required and, in turn, resulting in a longer service life of all of the associated components.

As shown in FIGS. 2-7, the tab stock feeder assembly 20 further includes a drive wheel 28. The tab stock feeder assembly drive wheel 28 is operatively engaged by the conversion press drive assembly (not shown) and rotates with respect to the base 40. The axis of rotation for the tab stock feeder assembly drive wheel 28 extends generally parallel to the axis of rotation of the lifted member assembly hinge pin 64. In the embodiment shown, the tab stock feeder assembly drive wheel 28 is disposed below the elevation of the lifted member assembly 42.

Further, the plurality of support elements 22 includes a support arm 80 and the plurality of rotating elements 24 includes a biasing roller assembly 90. The support arm 80 is coupled, directly coupled, or fixed to the lifted member assembly 42 and moves therewith. That is, the support arm 80 includes an elongated body 82 having a first end 83 and a second end 84 (best shown in the enlarged section view of FIG. 7). The support arm body first end 83 is coupled, directly coupled, or fixed to the lifted member assembly 42. In an exemplary embodiment, the lifted member assembly 42 includes a support arm mounting 86 that extends from the other portions of the lifted member assembly 42. The support arm body first end 83 is coupled, directly coupled, or fixed to support arm mounting 86. Further, the support arm body second end 84 defines a mounting passage 88. The support arm body second end 84 includes a mounting passage 88 that extends generally parallel to the axis of rotation of the lifted member assembly hinge pin 64.

Figure 7:
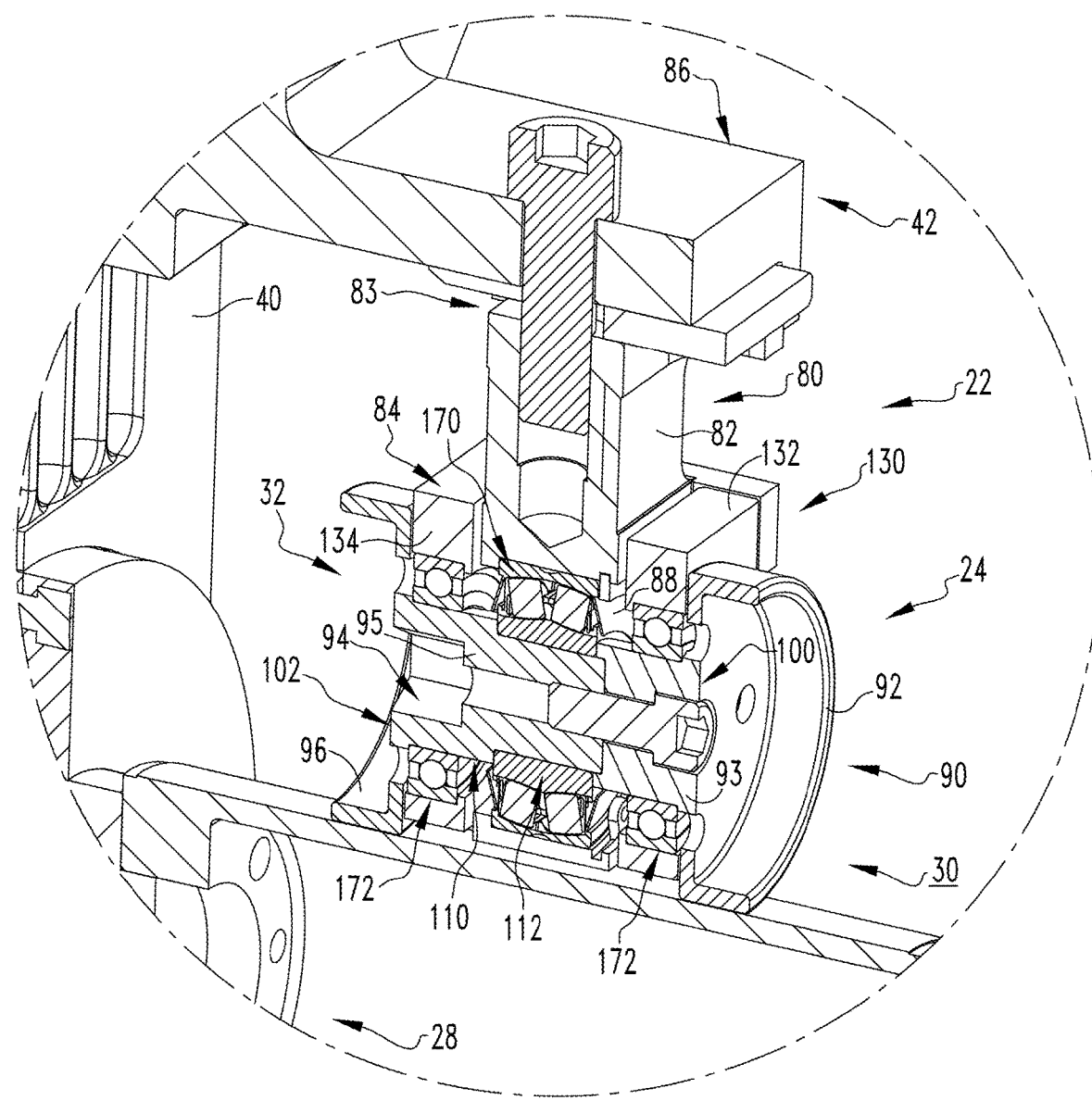
FIG. 7 is an enlarged view of a portion of FIG. 5.

As best shown in FIG. 7, the biasing roller assembly 90 is disposed at the support arm body second end 84. The biasing roller assembly 90 includes a first roller 92, an axle 94 and a second roller 96. In an exemplary embodiment, the biasing roller assembly axle 94 is bifurcated and the halves are structured to be, and are, coupled to each other thereby forming the biasing roller assembly axle 94. That is, in an exemplary embodiment, the biasing roller assembly 90 includes a first component 100 that includes the first roller 92 and an axle first half 93 as a unitary body, and, a second component 102 that includes the second roller 96 and an axle second half 95 as a unitary body. The biasing roller assembly first and second components 100, 102 are coupled so as to form the biasing roller assembly 90. Further, in an exemplary embodiment, the biasing roller assembly first roller 92 and the biasing roller assembly second roller 96 have a "roller radius." The biasing roller assembly axle 94 has a first portion 110 with a first radius and a second portion 112 with a second radius. The roller radius is larger than the first radius, and, the first radius is larger than the second radius.

In an exemplary non-limiting embodiment, the biasing roller assembly 90 further includes a motion limiter 130. The biasing roller assembly motion limiter 130 is structured to, and does, limit the rotation of the biasing roller assembly 90 about one axis of the biasing roller assembly 90 relative to the support arm 80. That is, as used herein, the coupling of the biasing roller assembly 90 and the support arm 80 includes three axes; an "X-axis" which is the axis that extends along the axis of rotation of the biasing roller assembly 90, a "Y-axis" which extends along the direction the tab stock moves, as discussed below, and a "Z-axis" which extends along, or parallel to, the longitudinal axis of the support arm 80. In an exemplary embodiment, the biasing roller assembly motion limiter 130 is structured to, and does, limit the rotation of the biasing roller assembly 90 about the "Z-axis."

That is, the biasing roller assembly motion limiter 130 includes a first toroid body 132 and a second toroid body 134. The biasing roller assembly motion limiter first toroid body 132 is disposed between the biasing roller assembly first roller 92 and the support arm body second end 84. The biasing roller assembly motion limiter second toroid body 134 is disposed between the biasing roller assembly second roller 96 and the support arm body second end 84. Each biasing roller assembly motion limiter toroid body 132, 134 substantially fills the space between the rollers 92, 96 and the support arm body 82, specifically, second end 84. In this configuration, the biasing roller assembly motion limiter 130 is structured to, and does, limit the rotation of the biasing roller assembly 90 about an axis aligned with said support arm 80 longitudinal axis, i.e., the "Z-axis" identified above.

The biasing roller assembly 90 is assembled when the biasing roller assembly axle 94 is disposed in the support arm body second end mounting passage 88. As noted above, the biasing roller assembly motion limiter first toroid body 132 is disposed between the biasing roller assembly first roller 92 and the support arm body second end 84. The biasing roller assembly motion limiter second toroid body 134 is disposed between the biasing roller assembly second roller 96 and the support arm body second end 84. It will be appreciated that, in addition to providing significantly improved wear reduction and thus longer service life than prior art designs wherein metal components often directly engaged and moved with respect to one another causing significant wear, the aforementioned assembly also aids in relatively quick and easy assembly as well as disassembly, repair and reassembly, when required.

Figure 2:
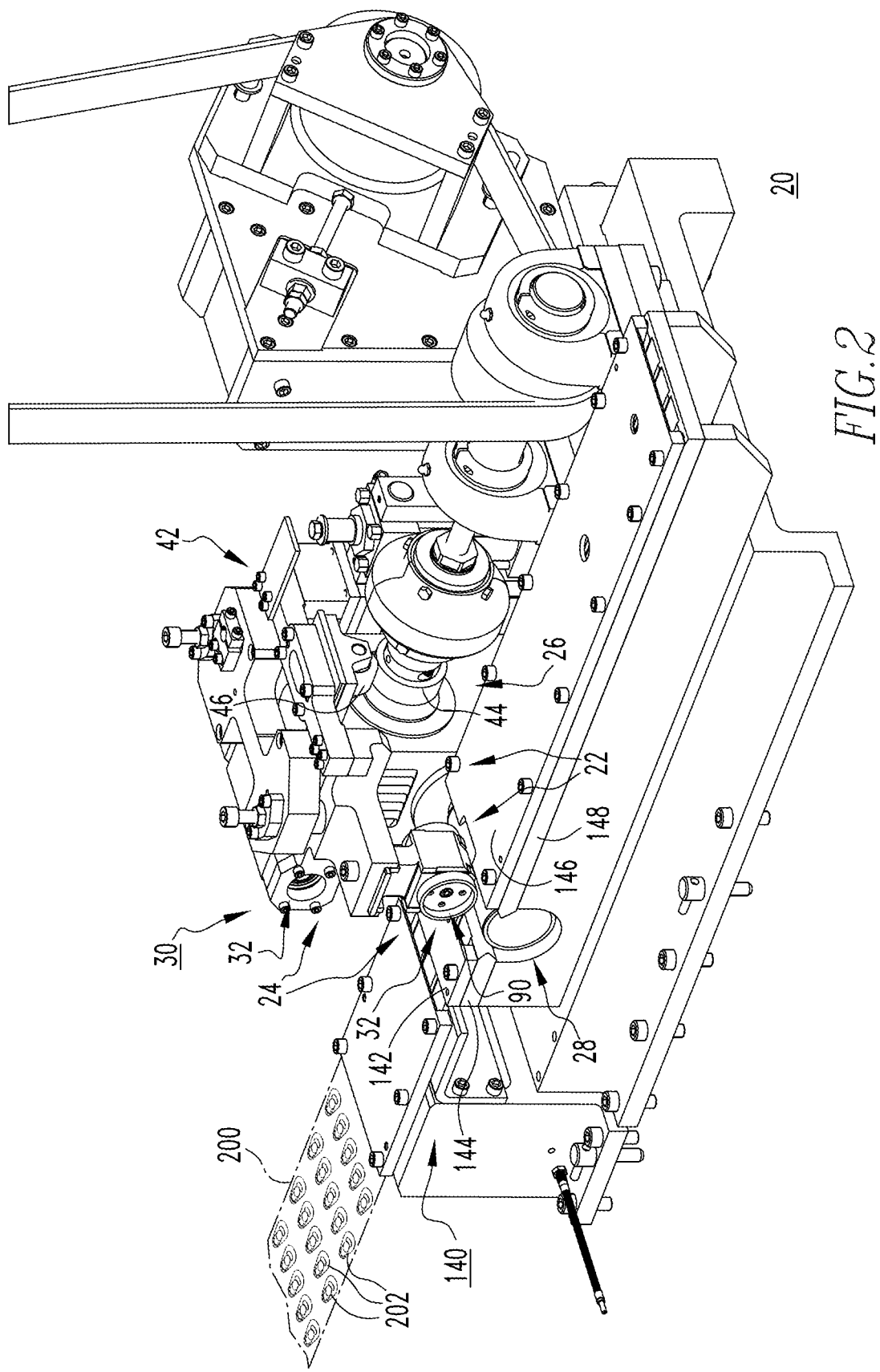
FIG. 2 is an isometric view of the tab stock feeder assembly of FIG. 1.

Finally, in an exemplary embodiment, the tab stock feeder assembly 20 includes a stock guide assembly 140 (best shown in FIG. 2). As shown in FIG. 2, the stock guide assembly 140 includes generally planar members 142, 144, 146, 148 disposed in opposing pairs. That is, stock guide assembly planar member 142 is narrowly spaced from stock guide assembly planar member 144 and stock guide assembly planar member 146 is narrowly spaced from stock guide assembly planar member 148. The spacing between the stock guide assembly planar members 142, 144, 146, 148 is slightly greater than the thickness of the tab stock. Further, the pairs of stock guide assembly planar members 142, 144 and 146, 148 are also spaced from each other. The drive wheel 28, and more specifically the outer radial surface (not numbered) of the drive wheel 28, is disposed in the gap between the pairs of stock guide assembly planar members 142, 144 and 146, 148.

In this configuration, the tab stock feeder assembly 20 operates, generally, as follows. The tab stock 200 (shown in simplified form) is moved through the tab stock guide assembly 140 until it reaches the gap between the pairs of stock guide assembly planar members 142, 144 and 146, 148. When the lifted member assembly 42, and therefore the support arm 80 and biasing roller assembly 90, move into the first position, the biasing roller assembly 90 biases the tab stock 200 against the drive wheel 28, which itself rotates, and causes the tab stock 200 to move toward, and in between, the toolings (e.g., without limitation, upper tooling 12 and lower tooling 14 of FIG. 1). As the toolings 12, 14 move to their second position, i.e., the forming position, the lifted member assembly 42, and therefore the support arm 80 and biasing roller assembly 90, move into their second position. In the second position, the biasing roller assembly 90 does not bias the tab stock 200 against the drive wheel 28. Thus, when the toolings 12, 14 are in the forming, second position, the tab stock 200 is stationary. As the toolings 12, 14 move toward the first position, the lifted member assembly 42, and therefore the support arm 80 and biasing roller assembly 90, again move into the first position causing the tab stock 200 to move as described above. Thus, the tab stock feeder assembly 20 is structured to, and does, index, i.e., move intermittently, the tab stock 200 as the toolings 12, 14 form the tab stock 200 into tabs 202 and/or as the tabs 202 are affixed to can ends (not shown).

In this configuration, various elements of the tab stock feeder assembly 20 are exposed to wear. For example, referring to FIG. 6, the lifted member assembly hinge pin 64 is exposed to wear in a specific location as the lifted member assembly 42 preferably pivots over an arc of between 0-10 degrees and, more preferably, pivots less than 1 degree. That is, the wear is limited to the area of the lifted member assembly hinge pin 64 which contact the base plurality of hinge sleeves 52 and the lifted member assembly plurality of hinge sleeves 62 and is limited by the arc of motion. That is, the wear does not extend about the lifted member assembly hinge pin 64. Further, referring to FIGS. 2, 3, 5, 6 and 7, the biasing roller assembly 90 is exposed to wear generated by forces applied to a rotating element in a plane other than the plane of rotation of that element. That is, the biasing roller assembly 90 is exposed to forces in planes other than the plane of rotation of the biasing roller assembly 90. The wear reduction assembly 30 is structured to, and does, reduce the wear on the lifted member assembly hinge pin 64 and the biasing roller assembly 90. In an exemplary embodiment, the plurality of wear reducing elements 32 includes a number of ball bearings 150 and a number of one-way clutch devices 160. At least one such wear reducing element 32 is disposed between the lifted member assembly hinge pin 64 and at least one of the base plurality of hinge sleeves 52 and/or the lifted member assembly plurality of hinge sleeves 62, as best shown in the section view of FIG. 6. Further, at least one such wear reducing element 32 is disposed between the biasing roller assembly 90 and the support arm 80, as best shown in the enlarged section view of FIG. 7.

Figure 6:
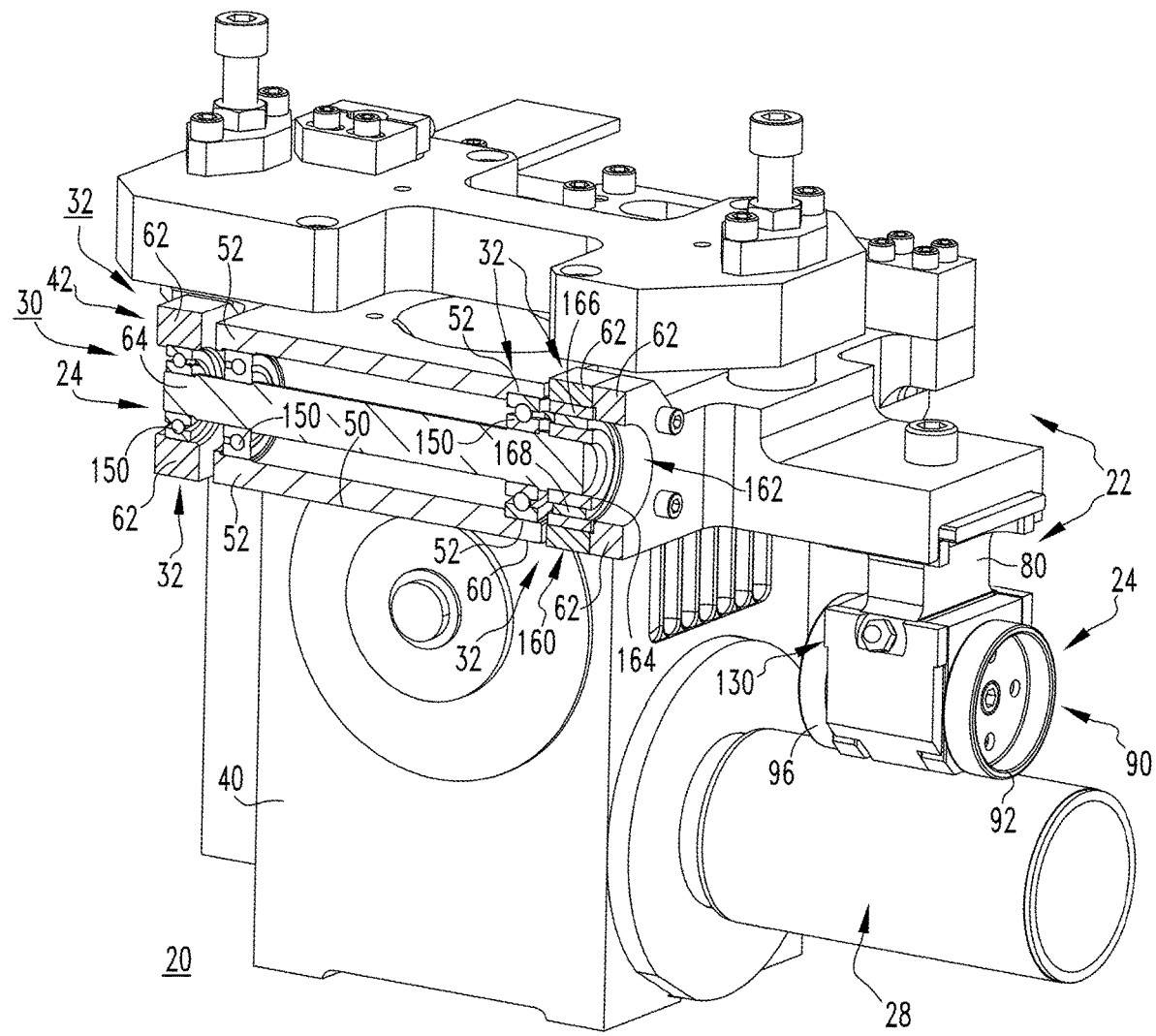
FIG. 6 is an isometric section view taken along line 6-6 of FIG. 4.

As shown in FIG. 6, in an exemplary non-limiting embodiment, a one-way clutch device 160 is disposed between the lifted member assembly hinge pin 64 and one lifted member assembly hinge sleeve 62. In one embodiment, not shown, the one-way clutch device 160 is a spring clutch, i.e., a spring-like member helically disposed about the lifted member assembly hinge pin 64. In the embodiment shown, the one-way clutch device 160 is a one-way clutch bearing 162. The one-way clutch bearing 162 includes an inner race 164, an outer race 166 and a plurality of non-spherical bearing elements 168 therebetween. The non-spherical bearing elements 168 are, typically, identified as "sprags." The non-spherical bearing elements 168 are structured to, and do, allow the inner race 164 and the outer race 166 to rotate in a single direction relative to each other. Further, the inner race 164 is fixed to the lifted member assembly hinge pin 64 and the outer race 166 is fixed to the lifted member assembly hinge sleeve 62. In this configuration, and as the lifted member assembly 42 reciprocates between the first and second positons, the one-way clutch bearing 162 causes the lifted member assembly hinge pin 64 to rotate in a single direction. That is, for example, as the lifted member assembly 42 moves toward the first position, the one-way clutch bearing races 164, 166 rotate relative to each other, thus, the lifted member assembly hinge pin 64 does not move. As the lifted member assembly 42 moves toward the second position, the one-way clutch bearing races 164, 166 do not rotate relative to each other. As the inner race 164 is fixed to the lifted member assembly hinge pin 64 and the outer race 166 is fixed to the lifted member assembly hinge sleeve 62, this causes the lifted member assembly hinge pin 64 to rotate relative to the lifted member assembly hinge sleeves 62. Thus, any wear generated between the lifted member assembly hinge pin 64 and the lifted member assembly hinge sleeves 62 occurs about, i.e., 360 degrees, the lifted member assembly hinge pin 64. Thus, the wear is no longer caused in a specific location. This solves the problem(s) noted above.

Further, in an exemplary non-limiting embodiment shown in FIG. 7, a spherical roller bearing 170 is disposed between the biasing roller assembly 90 and the support arm 80. That is, a spherical roller bearing 170 is disposed in the support arm body second end mounting passage 88 between the support arm 80 and the biasing roller assembly axle second portion 112. In this configuration, forces along the "Y-axis" cause the biasing roller assembly 90 to rotate about the "Y-axis." This motion both reduces wear on the biasing roller assembly 90 and allows the biasing roller assembly 90 to engage the tab stock 200 (FIG. 2) evenly. A pair of toroidal bearing assemblies, such as toroidal ball bearings 172, are preferably disposed in the upper arm body second end mounting passage 88 between the biasing roller assembly axle first portion 110 proximate opposing ends of the axle 94, as shown in FIG. 7. It will be appreciated that the foregoing features individually and/or in combination function to solve the problem(s) noted above.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A tab stock feeder assembly for a press, said tab stock feeder assembly comprising:
   a plurality of support elements;
   a plurality of rotating elements;
   a number of operative elements;
   each rotating element rotatably coupled to an associated support element;
   each operative element coupled to at least one of said support element or one of said rotating element and wherein each said operative element is structured to be engaged by a rotating element; and
   a wear reduction assembly including a plurality of wear reducing elements, wherein a plurality of support elements have at least one wear reduction assembly wear reducing element disposed between a rotating element and the associated support element;
   wherein said plurality of wear reducing elements includes a number of ball bearings and a number of one-way clutch devices;
   wherein said one-way clutch device is a one-way clutch bearing; and
   wherein said one-way clutch bearing including an inner race, an outer race and a plurality of non-spherical bearing elements therebetween.

2. The tab stock feeder assembly of claim 1, wherein:
   said plurality of support elements includes a base and a lifted member assembly;
   said plurality of rotating elements includes said lifted member assembly and a cam member;
   said number of operative elements including a cam follower;
   said cam member rotatably coupled to said base;
   said lifted member assembly rotatably coupled to said base;
   said cam follower coupled to said lifted member assembly and structured to be operatively engaged by said cam member;
   wherein said cam member is structured to rotate on said base and to operatively engage said cam follower whereby said lifted member assembly is structured to move in a reciprocating pivoting motion between a first position, wherein said lifted member assembly is generally adjacent said base, and, a second position, wherein said lifted member assembly is generally spaced from said base; and
   wherein said plurality of wear reducing elements includes a number of spherical bearings and a number of one-way clutch devices.

3. The tab stock feeder assembly of claim 2 wherein:
   said lifted member assembly includes an hinge pin and plurality of hinge sleeves;
   said base includes a plurality of hinge sleeves;
   wherein said lifted member assembly hinge pin extends through said lifted member assembly plurality of hinge sleeves and said base plurality of hinge sleeves thereby pivotally coupling said lifted member assembly to said base;
   wherein a one-way clutch device is disposed between said lifted member assembly hinge pin and at least one of said lifted member assembly plurality of hinge sleeves; and
   wherein, said one-way clutch device is structured to rotate said lifted member assembly hinge pin when said lifted member assembly moves between said first and second positions.

4. The tab stock feeder assembly of claim 3 wherein:
   said one-way clutch device is a one-way clutch bearing; and
   said one-way clutch bearing including an inner race, and outer race and a plurality of non-spherical bearing elements therebetween.

5. The tab stock feeder assembly of claim 1, wherein:
   said plurality of support elements includes a base, a lifted member assembly, and a support arm;
   said plurality of rotating elements includes said lifted member assembly, a cam member and a biasing roller assembly;
   said number of operative elements including a cam follower;
   said cam member rotatably coupled to said base;
   said lifted member assembly rotatably coupled to said base;
   said cam follower coupled to said lifted member assembly and structured to be operatively engaged by said cam member;
   wherein said cam member is structured to rotate on said base and to operatively engage said cam follower whereby said lifted member assembly is structured to move in a reciprocating pivoting motion between a first position, wherein said lifted member assembly is substantially adjacent said base, and, a second position, wherein said lifted member assembly is substantially spaced from said base;
   said support arm including a body defining a passage;
   said support arm coupled to said lifted member assembly;
   said biasing roller assembly including a first roller, an axle and a second roller;
   said biasing roller assembly axle rotatably disposed in said support arm passage; and
   wherein said plurality of wear reducing elements includes a number of spherical roller bearings and a number of ball bearings.

6. The tab stock feeder assembly of claim 5, wherein a spherical roller bearing is disposed between said biasing roller assembly axle and said support arm.

7. The tab stock feeder assembly of claim 6, wherein:
   said biasing roller assembly includes a motion limiter; and
   said biasing roller assembly motion limiter structured to limit the rotation of said biasing roller assembly about one axis of said biasing roller assembly relative to said support arm.

8. The tab stock feeder assembly of claim 7, wherein:
   said support arm includes an elongated body having a longitudinal axis; and
   said biasing roller assembly motion limiter structured to limit the rotation of said biasing roller assembly about an axis aligned with said support arm longitudinal axis.

9. A press comprising:
   upper tooling;
   lower tooling; and
   a tab stock feeder assembly comprising:
      a plurality of support elements;
      a plurality of rotating elements;
      a number of operative elements;

each rotating element rotatably coupled to an associated support element;
each operative element coupled to at least one of said support element or one of said rotating element and wherein each said operative element is structured to be engaged by a rotating element; and
a wear reduction assembly including a plurality of wear reducing elements, wherein a plurality of support elements have at least one wear reduction assembly wear reducing element is disposed between a rotating element and the associated support element, wherein said tab stock feeder assembly is structured to feed tab stock between said upper tooling and said lower tooling;
wherein said plurality of wear reducing elements includes a number of ball bearings and a number of one-way clutch devices;
wherein said one-way clutch device is a one-way clutch bearing; and
wherein said one-way clutch bearing including an inner race, an outer race and a plurality of non-spherical bearing elements therebetween.

10. The press of claim 9, wherein:
said plurality of support elements includes a base and a lifted member assembly;
said plurality of rotating elements includes said lifted member assembly and a cam member;
said number of operative elements including a earn follower;
said cam member rotatably coupled to said base;
said lifted member assembly rotatably coupled to said base;
said cam follower coupled to said lifted member assembly and structured to be operatively engaged by said cam member;
wherein said cam member is structured to rotate on said base and to operatively engage said cam follower whereby said lifted member assembly is structured to move in a reciprocating pivoting motion between a first position, wherein said lifted member assembly is generally adjacent said base, and, a second position, wherein said lifted member assembly is generally spaced from said base; and
wherein said plurality of wear reducing elements includes a number of spherical bearings and a number of one-way clutch devices.

11. The press of claim 10 wherein:
said lifted member assembly includes an hinge pin and plurality of hinge sleeves;
said base includes a plurality of hinge sleeves;
wherein said lifted member assembly hinge pin extends through said lifted member assembly plurality of hinge sleeves and said base plurality of hinge sleeves thereby pivotally coupling said lifted member assembly to said base;
wherein a one-way clutch device is disposed between said lifted member assembly hinge pin and at least one of said lifted member assembly plurality of hinge sleeves; and
wherein, said one-way clutch device is structured to rotate said lifted member assembly hinge pin when said lifted member assembly moves between said first and second positions.

12. The press of claim 11 wherein:
said one-way clutch device is a one-way clutch bearing; and
said one-way clutch bearing including an inner race, and outer race and a plurality of non-spherical bearing elements therebetween.

13. The press of claim 9, wherein:
said plurality of support elements includes a base, a lifted member assembly, and a support arm;
said plurality of rotating elements includes said lifted member assembly, a cam member and a biasing roller assembly;
said number of operative elements including a cam follower;
said cam member rotatably coupled to said base;
said lifted member assembly rotatably coupled to said base;
said cam follower coupled to said lifted member assembly and structured to be operatively engaged by said cam member;
wherein said cam member is structured to rotate on said base and to operatively engage said cam follower whereby said lifted member assembly is structured to move in a reciprocating pivoting motion between a first position, wherein said lifted member assembly is substantially adjacent said base, and, a second position, wherein said lifted member assembly is substantially spaced from said base;
said support arm including a body defining a passage;
said support arm coupled to said lifted member assembly;
said biasing roller assembly including a first roller, an axle and a second roller;
said biasing roller assembly axle rotatably disposed in said support arm passage; and
wherein said plurality of wear reducing elements includes a number of spherical roller bearings and a number of ball bearings.

14. The press of claim 13, wherein a spherical roller bearing is disposed between said biasing roller assembly axle and said support arm.

15. The press of claim 14, wherein:
said biasing roller assembly includes a motion limiter; and
said biasing roller assembly motion limiter structured to limit the rotation of said biasing roller assembly about one axis of said biasing roller assembly relative to said support arm.

16. The press of claim 15, wherein:
said support arm includes an elongated body having a longitudinal axis; and
said biasing roller assembly motion limiter structured to limit the rotation of said biasing roller assembly about an axis aligned with said support arm longitudinal axis.

* * * * *